United States Patent
Ohta et al.

[15] 3,704,468
[45] Nov. 28, 1972

[54] ELECTRONIC GRAPHIC RECORDING SYSTEM

[72] Inventors: Wasaburo Ohta, Yokohama; Noboru Murayama, Sagamihara, both of Japan

[73] Assignee: Ricoh Co., Ltd., Tokyo, Japan

[22] Filed: April 24, 1970

[21] Appl. No.: 31,598

[30] Foreign Application Priority Data

April 25, 1969 Japan ....................44/32096

[52] U.S. Cl. ............346/74 CR, 346/34, 346/74 EB
[51] Int. Cl. ..........................................G01d 15/06
[58] Field of Search.................346/74 CR, 74 EB, 34

[56] References Cited

UNITED STATES PATENTS

| | | | |
|---|---|---|---|
| 3,094,699 | 6/1963 | Supernowicz | 346/74 CR |
| 3,475,761 | 10/1969 | Samodai et al. | 346/34 X |
| 2,501,791 | 3/1950 | Silverman | 346/34 X |
| 3,331,077 | 7/1967 | Plank | 346/74 CR |
| 3,409,901 | 11/1968 | Dost et al. | 346/74 CR |

*Primary Examiner*—Stanley M. Urynowicz, Jr.
*Assistant Examiner*—Gary M. Hoffman
*Attorney*—Henry T. Burke, Lester W. Clark, Robert S. Dunham, P. E. Henninger, Thomas F. Moran, Gerald W. Griffin, R. Bradlee Boal, Christopher C. Dunham and Robert Scobey

[57] ABSTRACT

An electronic graphic recording system is provided in which the electron beam deflection in marking means as cathode-ray tube or the like is controlled in response to a signal representative of a variable or data and a signal representative of the electron beam deflection is recorded upon moving exhibiting means, thereby providing a record of the variable or data as a function of time. A circuit for shifting the level of the variable or data signal by a predetermined level and a blanking circuit are further added so that a plurality of variables or data may be recorded upon a single exhibiting means.

6 Claims, 4 Drawing Figures

INVENTORS
WASABURO OHTA
NOBORU MURAYAMA

ELECTRONIC GRAPHIC RECORDING SYSTEM

BACKGROUND OF THE INVENTION

The present invention relates to a graphic recording instrument and more particularly an electronic graphic recording system for providing a record of a variable or data as a function of time.

A wide variety of graphic recording instruments are known in order to record a variable or variables as a function of time. In the graphic recording instruments employing a strip-chart and a mechanical marking means such as a pen, there arises a problem in recording of rapidly changing quantities with a rate of higher than 100 cps because of the inertia and frictional load of mechanical marking means. To record such rapidly changing quantities, a light beam type magnet oscillograph may be used, but this is only usable up to 500 cps. To record quantities changing at a rate in excess of 500 cps, cathode-ray oscilloscope which can response as high as 2,000 Mc may be used. But both of the light beam type electromagnetic oscillograph and the cathode-ray oscillograph are complex in construction and very expensive. Recording is made generally by a photographic film whose development takes a relatively long time. Immediate studies on the records are not possible.

SUMMARY OF THE INVENTION

It is therefore the general object of the present invention to provide an improved electronic graphic recording system capable of recording instantaneous values of a variable or quantity which vary at a high-speed.

It is another object of the present invention to provide an improved electronic graphic recording system which can record a plurality of variables on the same time scale and on a single recording medium so that more accurate studies can be facilitated.

It is a further object of the present invention to provide an improved electronic graphic recording system having a higher full-scale step-response time simple in construction, compact in size accurate in recording and inexpensive to manufacture.

It is a further object of the present invention to provide an improved electronic graphic recording system which can graph upon the recording medium not only a continuous tracing curve but also broken-line curves for facilitating the studies of the recorded graph.

The present invention is based upon the novel principle that the electron beam in marking means of the cathode-ray tube type is so controlled as to deflect only horizontally, opposed to the cathode-ray oscilloscope or the like, in response to the instantaneous values of a variable or variables to be recorded, thereby providing a record or records of the variable or variables upon a recording medium.

According to one aspect of the present invention, blanking circuit means is provided so that broken-line curves may be graphed upon a recording medium.

According to one embodiment of the present invention, an electronic graphic recording system comprises, in combination, marking means of the cathode-ray tube type, having means for deflecting the electron beams only horizontally; exhibiting means of the type of being sensitive to the radiation beam from the marking means and moving at a constant velocity like the strip-chart; and means to apply variable or data signal for applying to means for deflecting electron beam of the marking means of the signals representative of a variable or data, thereby controlling the deflection of the electron beam depending upon the signals, thereby recording the trace of the radiation beam projected upon the exhibiting means.

According to another embodiment of the present invention, said means for applying variable or data signal comprises adder means, sequential means for applying sequentially, cyclically said variable or data signals to said adder, level shift means for generating a plurality of outputs each having a predetermined level for each of a plurality of variable or data signals, said different level outputs of said level shift means being added in said adder means to the corresponding variable or data signals so as to shift the reference points or lines of said variables or data from the distances determined by said level difference among said outputs from said level shift means and blanking circuit for applying a blanking signal to said marking means as cathode-ray tube or the like during the time when no variable or data signals are applied to said adder, whereby a plurality of records of said variables or data as a function of time upon the single exhibiting means. According to this embodiment, broken-line curves are traced or graphed.

The above and other objects, features and advantages of the present invention will become more apparent from the following description of preferred embodiments thereof with reference to the accompanying drawings.

DESCRIPTION OF THE PREFERRED EMBODIMENTS

Figure 1:
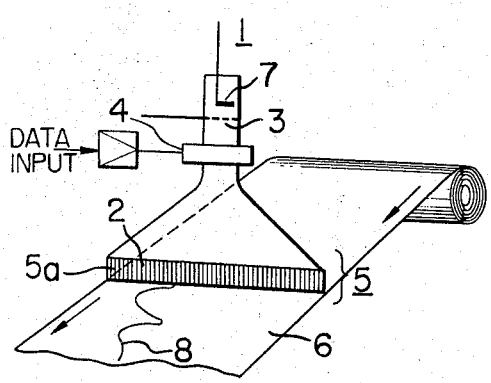
FIG. 1 is a schematic diagram for explanation of a single channel electronic graphic recording system in accordance with the present invention for recording one variable or data.

Referring to FIG. 1, the first embodiment of the present invention a single channel electronic graphic recording system for recording only one variable will be described. A cathode-ray tube (CRT) 1 used in the instant embodiment has a front window or front plate 5 (equivalent to a fluorescent screen of a cathode-ray tube of an ordinary type) consisting of a fluorescent or phosphor screen 2 and an assembly of optical fibers 5a. It should be noted that the front window or front plate 5 has such dimensions that the electron beam controlled by a deflection yoke 4 (which may be an electrostatic system) of the CRT 1 may deflect only horizontally, that is to the left from the right or vice versa in FIG. 1. Other types of the front window or front plate 5 may be used. They are for example, a fluorescent screen as the most conventional CRT, a fluorescent screen and optical fiber, a row of conductive pins, a transmission type in which electron beam is derived through a thin metallic film.

An electron beam control grid 3 in CRT 1 is for controlling the intensity of the electron beam so as to control, for example, the luminescence of the screen 2. The deflecting yoke or coil 4 mounted upon CRT 1 is for control the deflection of the electron beam in response to a signal representative of an instantaneous value of a variable or data to be recorded.

Exhibiting means or recording member 6 used in the present invention is of a photosensitive type such as sensitized film of silver halide, electrophotographic sensitized paper, electrostatic paper upon which is directly recorded a charge pattern, etc. These photosensitive recording media must be, of course, sensitive to the radiation beam which is converted from the electron beam and inpinged upon the recording member 6. A latent image formed upon the recording member 6 must be, of course, developed into a visible image by a suitable developing device and a suitable developer (not shown). A suitable CRT 1 may be selected depending upon a type of recording member 6. The recording member 6 is advanced in one direction indicated by the arrows by a drive means (not shown) of constant velocity such as a pulse motor in a similar manner as the graphic recording instrument employing a strip-chart in the case of the prior art.

The electrons emitted from a cathode 7 of CRT 1 are accelerated, focused and deflected by the deflecting yoke 4 in response to the input applied thereto in a similar manner as well known in the art. Since a signal representative of an instantaneous value of a variable or data to be recorded is applied to the deflection yoke 4 so that the electron beam and consequently the resulting luminous spot impinged upon the fluorescent screen 2 are deflected in proportion to an instantaneous value of a variable or data. That is, a luminous or light spot upon the fluorescent screen 2 moves to left from right or vice versa by a distance substantially in proportion to a magnitude of signal applied to the deflection yoke 4. The light is transmitted through the optical fiber 5a and impinged upon the recording member 6 which is advanced with a known constant velocity in a direction at a right angle relative to the electron beam deflection. Thus, a latent image of a waveform traced by the light beam is formed upon the photosensitive recording member. The latent image may be immediately developed by a suitable developing device (not shown) so that a visible waveform 8 is obtained. The lateral position upon the waveform from a reference line is, of course, representative of the instantaneous value of a variable or data.

Next referring to FIG. 2, a multi-channel electronic graphic recording system in accordance with the present invention for recording a plurality of variables or data will be described.

Figure 2:
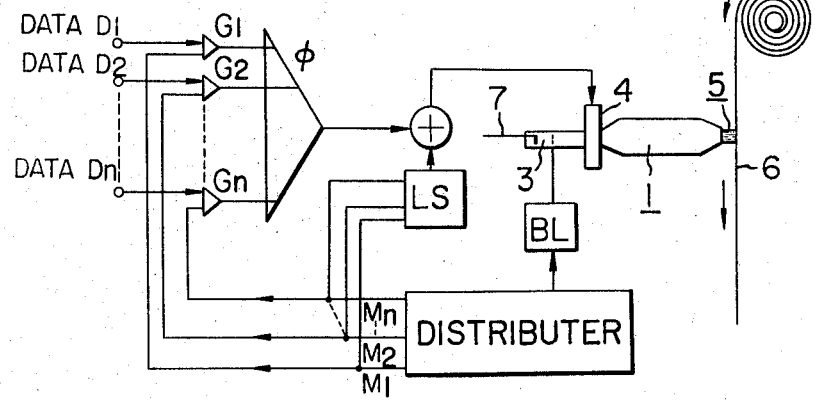
FIG. 2 is a schematic diagram for explanation of a multi-channel electronic graphic recording system in accordance with the present invention for recording a plurality of variables or data.

In FIG. 2 parts designated by same reference numerals as in FIG. 1 have the same functions as described above, so that they are not described. This system is employed for recording upon a single recording member 6 but at different positions thereof a plurality of concurrent but different kinds of variables or data are recorded. The second embodiment further incorporates sequential means, level shift means LS, adder means ⊕ and blanking circuit means BL as will be described in more detail hereinafter.

The sequential means for applying sequentially a plurality of signals representative of instantaneous values of variables or data to the deflection yoke 4 comprises a plurality of gates $G_1 - G_n$ and a distributor 9. A plurality of inputs $D_1 - D_n$ are gated by the gates $G_1 - G_n$ respectively by mode outputs or gating-in pulses $M_1 - M_n$ generated by the distributor 9. The gated inputs $D_1 - D_n$ are applied to the adder ⊕ sequentially.

The outputs from the level shifter means LS which are different from each other for each of the inputs $D_1 - D_n$ and are generated in response to the outputs $M_1 - M_n$ from the distributor 9, are also applied to the adder ⊕. In the adder ⊕, each of the outputs from the level shifter means LS is added to the corresponding gated output $G_1 - G_n$ so that the latter is level-shifted as will be described in more detail hereinafter. The outputs from the adder ⊕ are applied to the deflection yoke 4, thereby deflecting the electron beam in response to the inputs $D_1 - D_n$ or signals representative of the instantaneous values of the variables or data. The blanking circuit means BL is adapted to apply a blanking signal to the control grid 3 of CRT 1 so that no electrons are emitted during the time when no signal is applied to the deflection yoke 4, that is the "rest" time interval of the sequential means.

Figure 3:
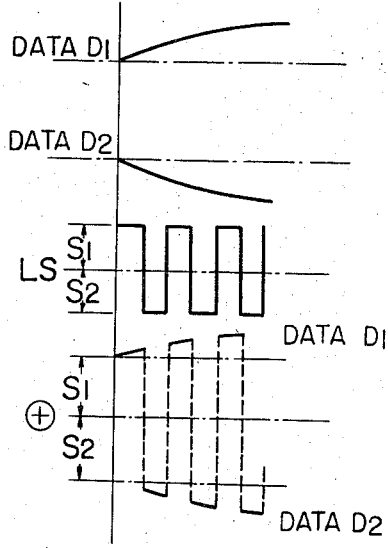
FIGS. 3 and 4 are graphs illustrating voltage waveforms at various parts of the system when two and three variables or data are being recorded respectively.
Figure 4:
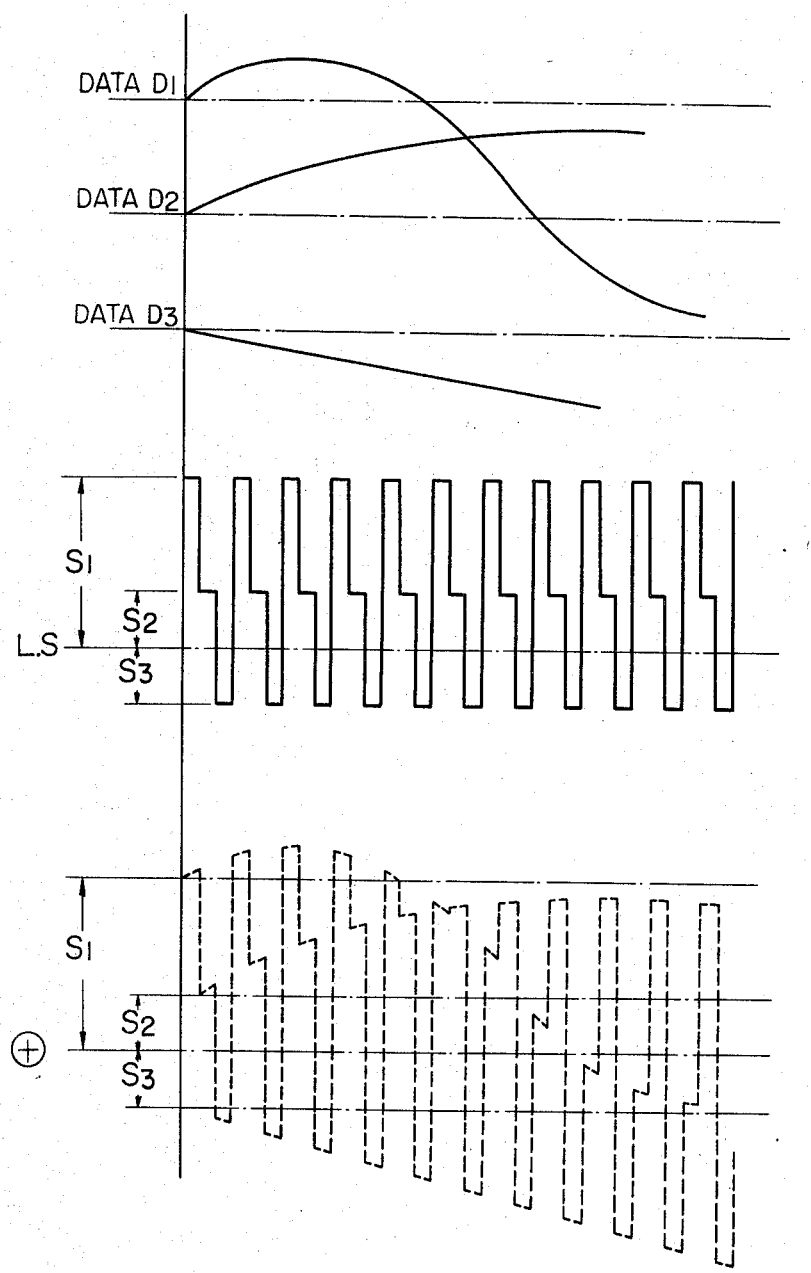

The mode how the waveforms are traced by the multi-channel system of the present invention will be described with reference to FIGS. 3 and 4. But it should be noted that the waveforms shown in FIGS. 3 and 4 are very schematic because in practice the pulse width of the output from the level shifter means LS is less than the order of $\mu$ sec., so that it is very difficult to associate the waveform of the level shifter means LS with those of data inputs $D_1 - D_n$. The solid line or broken line waveforms shown in FIGS. 3 and 4 at ⊕ illustrate the waveforms traced upon the recording member 6 of two and three variables or data simultaneously. The marks $S_1$, $S_2$ and $S_3$ designate the levels shifted for the inputs $D_1$, $D_2$ and $D_3$ respectively, that is the reference lines of these inputs. In this way of recording, the waveforms of the different variables or data may be readily distinguished from each other.

However, when a plurality of waveforms of different variables or data are desired to be traced with respect to the same reference line, no shift level signals are generated from the level shifter means SL or the signals from the level shifter means SL remain unchanged in level with respect to time.

It will be also readily seen that by suitably selecting a blanking time, the waveforms are traced by the solid lines as shown in FIG. 3 or by the broken lines as shown in FIG. 4. The fact that the waveforms are traced by the solid lines, dotted lines, broken lines, chain lines, etc. in accordance with the present invention will facilitate conveniently very much the studies of the records.

From the foregoing, it will be readily seen that the electronic recording system in accordance with the present invention can respond to a variable or variables whose instantaneous values are changing at high speed, with a higher degree of accuracy. For the better understanding of the advantages of the present invention hitherto unattained by the prior art, some experimental data are given. When the cathode-ray tube having a deflection yoke was used, the step-response time was as high as 100 $\mu$ sec. with a full-scale of 250 mm. When the cathode-ray tube having an electrostatic deflection system, the step-response time was further improved as high as 1 $\mu$ sec. with the same full-scale of 250 mm. This means that the step-response time of the electronic graphic recording system in accordance with the present invention is higher than that of the prior art by 1,000 to 100,000 times.

What is claimed is:

1. An electronic graphic recording system comprising, in combination,
    a. marking means of the cathode-ray tube type including electron emission means, a control grid, electron beam focusing means, and electron beam deflecting means for deflecting the electron beam only horizontally and means for converting the electron beam into a radiation beam;
    b. exhibiting means moving at a constant velocity in the direction at a right angle relative to said direction of deflecting electron beam, said exhibiting means being of the type sensitive to said radiation beam so as to record the trace of said radiation beam projected upon said exhibiting means;
    c. means for applying variable or data signals to said means for deflecting an electron beam representative of a plurality of variables or data for controlling said electron beam deflection depending upon said variable or data signals, said variable or data signal application means including adder means, means for applying sequentially, cyclically said variable or data signals to said adder, and level shift means for generating the same plurality of outputs each having a predetermined different level for each of said variable or data signals, said different level outputs of said level shift means being added in said adder means to the corresponding variable or data signals so as to shift the reference points or lines of said variables or data from each other by the distances determined by said level difference among said outputs from said level shift means, thereby controlling said electron beam deflection depending upon said variable or data signals, and
    d. blanking circuit means for applying a blanking signal to said control grid of said marking means of cathode ray tube type during the time when no variable or data signals are applied to said adder so that no electrons are emitted during the time when no signal is applied to said beam deflecting means, said blanking circuit applying and removing said blanking signal in correspondence with absence and presence of a data signal applied to said deflecting means, respectively, for permitting production of a radiation beam each time a data signal is applied to said deflecting means.

2. An electronic graphic recording system as specified in claim 1 wherein said blanking circuit means comprises means for applying said blanking signals to said control grid of said marking means of cathode-ray tube type at a predetermined time interval pattern even when each of said curves is traced for discontinuous tracing of the curves.

3. A system as defined in claim 1, wherein said exhibiting means comprises a silver halide sensitized member.

4. An electronic graphic recording system as specified in claim 1 wherein said exhibiting means is an electrophotographic sensitized member on which said radiation beam forms an electrostatic latent image.

5. An electronic graphic system as specified in claim 4 further including means for developing an electrostatic latent image formed upon said electrophotographic sensitized member.

6. An electronic graphic recording system comprising
    a. a cathode-ray tube including an electron beam source, a grid for controlling emission from said source, means for deflecting the emitted electron beam only horizontally, and means for converting the beam into a recordable radiation beam;
    b. means for recording said radiation beam, including a recording medium sensitized to record said radiation beam and means for advancing said medium at a constant predetermined rate, past a locality at which said medium is exposed to said radiation beam, in a direction perpendicular to the direction of deflection of the electron beam;
    c. means for applying data signals representative of a plurality of variables to said deflecting means for controlling deflection of the electron beam in accordance with said data signals, said signal-applying means including adder means, means for generating a corresponding plurality of pulses in a predetermined cyclical time sequence, means for cyclically and sequentially applying said plurality of data signals to said adder means in response to said pulses, and means for cyclically and sequentially generating and applying to said adder means in response to said pulses a corresponding plurality of outputs having respectively different levels, said last-mentioned outputs being respectively added in said adder means to the corresponding data signals for shifting the reference points of the data signals from each other by distances determined by the level differences among said last-mentioned outputs; and
    d. blanking circuit means responsive to said pulse-generating means for applying a blanking signal to said control grid between application of successive data signals to said adder means so that emission of the electron beam is interrupted between application of successive data signals as aforesaid, said blanking circuit applying and removing said blanking signal in correspondence with absence and presence of a data signal applied to said deflecting means, respectively, for permitting production of a radiation beam each time a data signal is applied to said deflecting means.

* * * * *